United States Patent
Lukas et al.

(10) Patent No.: US 10,842,286 B2
(45) Date of Patent: Nov. 24, 2020

(54) PIECE OF FURNITURE, A METHOD OF CALIBRATING AN ACTUATOR AND A METHOD OF ADJUSTING A COMPONENT OF A PIECE OF FURNITURE

(71) Applicant: LOGICDATA Electronic & Software Entwicklungs GmbH, Deutschlandsberg (AT)

(72) Inventors: Stefan Lukas, Preding (AT); Werner Schoegler, Graz (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 0 days.

(21) Appl. No.: 16/283,649

(22) Filed: Feb. 22, 2019

(65) Prior Publication Data
US 2019/0261778 A1  Aug. 29, 2019

(30) Foreign Application Priority Data
Feb. 23, 2018 (DE) .................. 10 2018 104 195

(51) Int. Cl.
| A47C 20/04 | (2006.01) |
| A47B 9/20 | (2006.01) |
| A47C 20/12 | (2006.01) |
| G01S 17/10 | (2020.01) |
| G01S 15/10 | (2006.01) |

(52) U.S. Cl.
CPC .............. *A47C 20/041* (2013.01); *A47B 9/20* (2013.01); *A47C 20/12* (2013.01); *G01S 15/10* (2013.01); *G01S 17/10* (2013.01); *A47B 2200/0051* (2013.01); *A47B 2200/0058* (2013.01); *A47B 2200/0059* (2013.01)

(58) Field of Classification Search
CPC .... A47B 9/00; A47B 9/04; A47B 9/10; A47B 9/12; A47B 9/20; A47B 2200/0051; A47B 2200/0057; A47B 2200/0058; A47B 2200/0059; A47B 2200/0061; A47B 2200/0062
USPC ........... 108/144.11, 147, 147.19; 73/862.381
See application file for complete search history.

(56) References Cited

U.S. PATENT DOCUMENTS

| 5,224,429 A | 7/1993 | Borgman et al. |
| 6,147,342 A | 11/2000 | Kucher |
(Continued)

FOREIGN PATENT DOCUMENTS

| CH | 710641 A2 | 7/2016 |
| DE | 3027374 A1 | 2/1982 |
(Continued)

*Primary Examiner* — Jose V Chen
(74) *Attorney, Agent, or Firm* — Morgan, Lewis & Bockius LLP

(57) ABSTRACT

An electrically adjustable piece of furniture comprises a first and at least one second actuator for adjusting a component of the piece of furniture and a controller for controlling the first and at least one second actuator. The actuators each have a first element and a second element which are displaceable relative to each other, and a sensor attached to the first element and adapted to measure a distance between the first and second elements. The distance measurement is based on a time-of-flight measurement of a wave. The controller is arranged to determine an absolute position of each actuator from the respectively measured distance.

9 Claims, 8 Drawing Sheets

(56) References Cited

U.S. PATENT DOCUMENTS

| | | | |
|---|---|---|---|
| 6,267,042 B1* | 7/2001 | Nagai | F15B 19/00 92/5 R |
| 6,327,791 B1 | 12/2001 | Norcross et al. | |
| 6,352,037 B1* | 3/2002 | Doyle | A47B 9/00 108/147 |
| 6,484,620 B2 | 11/2002 | Arshad et al. | |
| 6,588,313 B2 | 7/2003 | Brown et al. | |
| 6,710,327 B2* | 3/2004 | Arshad | F15B 15/2876 250/227.11 |
| 6,952,009 B1 | 10/2005 | Engstrand | |
| 7,003,828 B2 | 2/2006 | Roussy | |
| 7,658,359 B2* | 2/2010 | Jones | A47B 9/00 248/406.1 |
| 8,040,082 B2 | 10/2011 | Bastholm | |
| 8,253,790 B1* | 8/2012 | Trent | G01S 17/88 114/213 |
| 8,378,610 B2 | 2/2013 | Jensen | |
| 9,260,963 B2 | 2/2016 | Goodwin et al. | |
| 9,593,942 B2* | 3/2017 | Friend | F15B 15/2876 |
| 9,655,438 B1 | 5/2017 | Shoenfeld et al. | |
| 2009/0078167 A1* | 3/2009 | Ellegaard | A47B 9/00 108/21 |
| 2011/0203496 A1* | 8/2011 | Garneau | A47B 9/20 108/147 |
| 2012/0126072 A1* | 5/2012 | Pettersson | A47B 9/04 248/157 |
| 2012/0181968 A1* | 7/2012 | Clausen | A47B 9/00 318/504 |
| 2012/0247228 A1* | 10/2012 | Lukas | A47B 9/00 73/862.381 |
| 2013/0204438 A1* | 8/2013 | Hjelm | A47B 9/00 700/275 |
| 2014/0103174 A1* | 4/2014 | Koder | A47B 9/04 248/188.5 |
| 2015/0007756 A1* | 1/2015 | Kollreider | A47B 9/04 108/21 |
| 2016/0051042 A1* | 2/2016 | Koch | A47B 9/00 248/550 |
| 2016/0081468 A1* | 3/2016 | Molteni | A47B 9/00 108/147 |
| 2016/0128467 A1 | 5/2016 | Sigal et al. | |
| 2016/0309889 A1* | 10/2016 | Lin | A47B 9/00 |
| 2016/0353880 A1 | 12/2016 | Sigal et al. | |
| 2017/0052517 A1* | 2/2017 | Tsai | A47B 9/00 |
| 2018/0020831 A1* | 1/2018 | Lenz | A47C 3/30 297/174 R |
| 2018/0172062 A1* | 6/2018 | Hu | H02K 7/06 |
| 2018/0279769 A1* | 10/2018 | Zheng | A47C 31/008 |
| 2018/0368569 A1* | 12/2018 | Laing | A47B 9/00 |
| 2019/0029412 A1* | 1/2019 | Gibson | H04Q 9/04 |
| 2019/0252903 A1* | 8/2019 | Lukas | A47B 9/00 |
| 2019/0266879 A1* | 8/2019 | Zhu | A61B 5/1116 |
| 2019/0298055 A1* | 10/2019 | Yamamoto | A47B 9/20 |
| 2019/0343272 A1* | 11/2019 | Smith | A47B 13/16 |

FOREIGN PATENT DOCUMENTS

| | | |
|---|---|---|
| DE | 9417204 U1 | 2/1995 |
| DE | 102006013923 A1 | 9/2007 |
| DE | 102007009094 A1 | 8/2008 |
| DE | 202009000262 U1 | 7/2009 |
| DE | 102011007765 A1 | 10/2012 |
| DE | 102016102382 A1 | 10/2016 |
| EP | 0328972 A2 | 8/1989 |
| WO | WO-2012143171 A1 | 10/2012 |

* cited by examiner

PIECE OF FURNITURE, A METHOD OF CALIBRATING AN ACTUATOR AND A METHOD OF ADJUSTING A COMPONENT OF A PIECE OF FURNITURE

BACKGROUND OF THE INVENTION

The present disclosure relates to an electrically adjustable piece of furniture with a first and at least a second actuator for adjusting a component of the piece of furniture. The present disclosure also relates to a method for adjusting a component of such a piece of furniture and a method for calibrating an actuator of such a piece of furniture.

Adjustable furniture is known both in the office furniture sector and in the home sector. The most common designs in the office furniture sector are, for example, electrically adjustable tables or chairs, while electrically adjustable beds, seating furniture or reclining furniture are known in the home sector. With electrically adjustable furniture, it is often necessary to know the absolute position of all adjustable parts of the furniture. In the simplest case, it is only displayed to the user. In the case of several interacting actuators, for example table legs, which together adjust the height of a table top, it is necessary to know the position of each actuator and to synchronize it in the event of an adjustment. This ensures that the actuators have the same position in relation to each other during the entire adjustment and that, for example, the table top remains horizontal.

A common principle for determining the absolute position of an actuator is to determine a fixed position value and to measure a relative change in position of the actuator. With spindle-driven actuators, this can be done via magnetic or optical encoders, which measure the rotation of the spindle, from which the relative change can be determined.

During or at least after an adjustment operation, the current absolute position of the actuator is advantageously written into a non-volatile memory so that in the event of a power failure, the current position of the actuator is known immediately and not only after a new calibration of a reference position. This requires more effort in the manufacture of the actuator and also during operation, since under certain circumstances recalibrations may also be necessary. This applies, for example, if the storage of the current position is not successful due to a failure of the supply voltage during the storage process.

SUMMARY OF THE INVENTION

The present disclosure provides an improved measurement concept that allows more accurate and/or reliable position measurement of furniture actuators.

The improved measurement concept is based on the idea of determining the position of actuators by measuring the time-of-flight of a wave. For example, acoustic waves, especially ultrasound waves, or electromagnetic waves, especially light, can be used. The electromagnetic wave or the light, for example, can be generated by a laser. During measurement, the time-of-flight of a transmitted wave, e.g. a pulse, is determined between a transmitter and a receiver via a reflecting surface in order to determine the distance between the transmitter or receiver and the reflecting surface via the propagation speed of the wave. With the improved measuring concept, the distance between two points on the actuator that move relative to each other during an adjustment operation is measured.

According to the improved measurement concept, it is therefore possible to determine an absolute position of the actuator directly without having to rely on calibration procedures. At most, an initial determination of the dimensions of the furniture and/or the actuator during the manufacture of the furniture and/or the actuator may be necessary, but not a calibration during operation of the furniture.

In addition, the necessity of saving the momentary position and, in particular, ensuring the possibility of saving the momentary position at any time is eliminated. Thus, buffer capacitors for a supply voltage, for example, can be dimensioned smaller, since a failure of the supply voltage has no effect on a subsequent position determination. Furthermore, a large number of storage processes in a non-volatile memory module can be dispensed with, which is advantageous with regard to the limitation of storage cycles for such memory modules.

In an exemplary implementation of the improved measuring concept, an electrically adjustable piece of furniture comprises a first and an at least second actuator for adjusting a component of the piece of furniture and a controller for controlling the first and the at least one second actuator. The first and the at least one second actuator each comprise a first element and a second element which are displaceable relative to each other. On the first element is mounted a sensor adapted to measure a distance between the first and the second element, wherein the measurement of the distance is based on a time-of-flight measurement of a wave. The controller is arranged to determine an absolute position of the first and the at least one second actuator from the respective measured distance.

This makes it possible to determine the absolute position of the respective actuators accurately and directly independently of each other.

As already mentioned, the distance can be measured with a time-of-flight measurement of an acoustic wave, especially an ultrasonic wave. Alternatively, the measurement of the distance can be performed with an electromagnetic wave, especially in the form of light. The light can, for example, be generated by lasers in the form of pulses in order to determine the time-of-flight of the pulse. In such systems, the transmitter and receiver are preferably located in close proximity to each other. VCSELs (Vertical Cavity Surface Emitting Lasers) can be used as lasers, for example, which have a small size in the range of a few millimeters. Such lasers, for example, emit light with a wavelength of 940 nm.

In various implementations of the piece of furniture, the first and the at least one second actuator are each arranged within a respective telescopic profile tube. Such profile tubes are used, for example, in height-adjustable tables. The sensor can be positioned between an outside of the respective actuator and an inside of the respective telescopic profile tube. This makes the sensor invisible to the user. In addition, the sensors are protected against external influences.

In general, however, the sensor can also be arranged on the inside of the first and the at least one second actuator. The same characteristics apply with regard to visibility and protection against external influences.

In various implementations, a reflector for the wave is attached to the second element or the reflector is formed by the second element. This ensures that there is a defined point for the distance measurement between the sensor and this defined point.

The sensor and the reflector can, for example, be mounted at opposite ends of the actuator, whereby a selection of these locations can be made at will. Thus it is also possible that a distance between the sensor and the reflector in a retracted state of the actuator is smaller than 50% of an actuator length in the retracted state, e.g. smaller than 20%. The shortened distance, for example, allows a more accurate measurement.

In various implementations, a path between the sensor and the reflector can be provided with a sleeve, e.g. a telescopic sleeve. This also allows interference to be reduced. The sleeve is designed in such a way that its length adjusts when the actuator is adjusted.

The at least two actuators are, for example, of identical construction and/or have at least comparable adjustment parameters, for example with regard to stroke, dimensions or the like. The at least two actuators are preferably linear actuators. An adjustment between the first and the second element is carried out, for example, with a spindle drive. The spindle drive consists, for example, of a pairing of spindle and nut, with the spindle typically rotating and the nut moving linearly.

For example, the controller is implemented as a separate component, e.g. in its own housing, and connected accordingly to the actuators and sensors in order to determine the position on the one hand and to control the adjustment processes of the actuators on the other. Further functions of the controller are not excluded.

Alternatively, the controller can also be implemented distributed so that, for example, a separate control component is provided at each actuator, which carries out the respective control and/or position determination of the actuator. Such control components then form, for example, a common control of the piece of furniture.

The improved measuring concept also enables a better and more precise control of the actuators during an adjustment operation. For example, the controller is configured to proceed as follows for an adjustment operation: a joint target speed curve for the adjustment operation is determined based on a target position and a current position of the first and the at least one second actuator. The momentary absolute position of each actuator is determined from the measured distance. Based on the target speed curve, a joint target position curve is determined for a plurality of points in time during the adjustment operation. A respective speed of the first and the at least one second actuator is initially set, for example to start an actual movement of the actuators. A respective momentary position of the first and the at least one second actuator is compared iteratively with an associated position value of the target position curve. For example, the comparison is performed separately for each of the actuators. The respective speeds of the first and the at least one second actuator are adjusted based on the respective comparison.

The iterative comparison is done, for example, periodically or at other pre-defined or continuous points in time. For example, a time interval between two successive comparisons of one of the actuators is less than 200 ms, e.g. less than 100 ms. This ensures, for example, that possible deviations detected during comparison can be quickly compensated.

For example, the controller is configured when adjusting the respective speed to increase the speed of the actuator concerned if the momentary position of the actuator concerned is lagging behind the corresponding position value of the target position curve. Similarly, the speed of the actuator concerned is reduced if the momentary position of the actuator concerned is trailing the corresponding position value of the target position curve.

The described method, which is carried out by the controller, for example, particularly enables position synchronous control.

Electrically adjustable furniture systems or pieces of furniture are usually formed from a furniture frame, for example a table frame or bed frame, which comprises one or more adjustable furniture frame parts, for example a table top or a head part or foot part of a bed. Depending, for example, on the expected load, the furniture frame part may require two or more actuators to adjust as an adjustable component. This may also be necessary for reasons of stability, for example because otherwise a table top would not be stable or the furniture frame would deform under the load.

For a position-synchronous adjustment of the component with at least two actuators, each actuator takes up an essentially identical position at a certain point in time, i.e. has essentially the same length. Otherwise, for example, the component to be adjusted would deform or could be damaged.

A speed control can be achieved, for example, by providing the actuator with more or less current and/or voltage, which has a known influence on the speed of the actuator, especially the driving electric motor. This can be done, for example, by pulse width modulated, PWM, control, where a duty cycle of the PWM signal determines the voltage or power available to the motor. However, it is practically the case that a certain duty cycle of the PWM signal does not correspond to a certain speed, but that the speed also depends on the load situation of the actuator.

It is therefore possible that two actuators are operated with the same PWM duty cycle and still move at different speeds. This also means that two actuators with different PWM duty cycles are controlled and are nevertheless equally fast and positionally synchronous because, for example, one actuator moves a table area that is heavier loaded than the table area moved by another actuator. The friction in an actuator can also result in this actuator requiring a higher duty cycle and thus more energy or power to perform the adjustment at a certain speed and to maintain the specified position. This means that there is no direct and reliable correlation between a certain energy level or power level and a certain speed.

In the described method, for example, the adjustment operation is started by setting the same initial speed for both actuators. However, already after the first comparison operation a position deviation can occur, which leads to the setting of different speeds for the actuators. It should be noted that although the original basis for the adjustment is a target speed curve, actual control is based on the target position curve, which is the same for the actuators.

This ensures that the positions of several actuators are synchronous and that direction and speed can be specified simultaneously.

It should also be noted that the position of each actuator is not synchronized with the actual position of another actuator, but with the target position curve that is common to the actuators.

The previously described configurations were each explained with reference to two actuators. However, one or more additional actuators can also be used, which are then of the same construction or essentially of the same construction as the first and second actuators. This means that position determination and position synchronous control can also be performed for the additional actuators. Corresponding modifications result for the person skilled in the art directly from the explanations in the present disclosure.

In various implementations of the piece of furniture, the controller is configured to determine the absolute positions of the first and the at least one second actuator from the respective measured distance and a respective offset value. Such an offset value results, for example, from the positioning of the sensor in or on the actuator and from further dimensions of the piece of furniture in which the actuator(s) are installed.

In a further embodiment of the piece of furniture, the controller is configured to determine the respective absolute position of the first and at least one second actuator via an interpolation between at least two calibrated individual values on the basis of the respectively measured distance. For this purpose, for example, a first and at least one second pair of values are determined for each actuator, each of which determines a relationship between a measured distance and the associated position. A distance measured during operation can then be mapped to a curve formed by the pairs of values to determine the corresponding position. This is done, for example, by linear interpolation. However, interpolation can also be performed over a larger number of value pairs.

By using calibrated single values for an interpolation, the accuracy of the position measurement can be further improved.

In accordance with the improved measurement concept, an implementation of a method for calibrating an actuator is proposed, which is used in a piece of furniture in which the controller determines the position via an interpolation between calibrated single values as described above. For example, the calibrated individual values are to be stored in a non-volatile memory of the actuator.

In the calibration method, for example, the actuator is controlled to a first defined position corresponding to a first position value. In this first defined position, a first distance between the first and second element is measured. The first position value is stored in the memory together with the associated first distance. Similarly, the actuator is controlled to a second defined position corresponding to a second position value. Again, a second distance between the first and second element in this second defined position is measured and stored together with the second position value in the memory. Thus there are two pairs of values which can be used for interpolation as described above.

In further implementations of the method, the actuator is controlled into at least one further defined position corresponding to a further position value, and a further distance between the first and the second element is measured in this position. Again, the further position value is stored in the memory together with the corresponding further distance. This can be repeated for several defined positions.

For example, the first and second defined positions are formed by a respective mechanical stop of the actuator. Such mechanical stops can, for example, be formed by the extreme positions of the actuator, i.e. a fully retracted state or a fully extended state of the actuator.

According to a further implementation of the improved measuring concept, a method for adjusting a component of a piece of furniture according to one of the previously described implementations is proposed. The method comprises:

determining a joint target speed curve for the adjustment operation based on a target position and a current position of the first and the at least one second actuator;

determining a joint target position curve for a plurality of points in time of the adjustment operation based on the target speed curve;

initial setting of a respective speed of the first and the at least one second actuator;

iteratively comparing a respective momentary position of the first and the at least one second actuators with an associated position value of the target position curve; and adjusting the respective speeds of the first and the at least one second actuator based on the respective comparison.

Additional implementations of the adjustment method result for the skilled person directly from the previously described implementations of the piece of furniture.

BRIEF DESCRIPTION OF THE DRAWINGS

In the following, the invention is explained in detail with reference to the drawings on the basis of exemplary embodiments. Components that are functionally identical or have an identical effect can be provided with identical reference signs. Identical components or components with identical functions may only be explained with reference to the Figure in which they appear first. The explanation is not necessarily repeated in subsequent Figures.

In the drawings.

DETAILED DESCRIPTION

Figure 1:
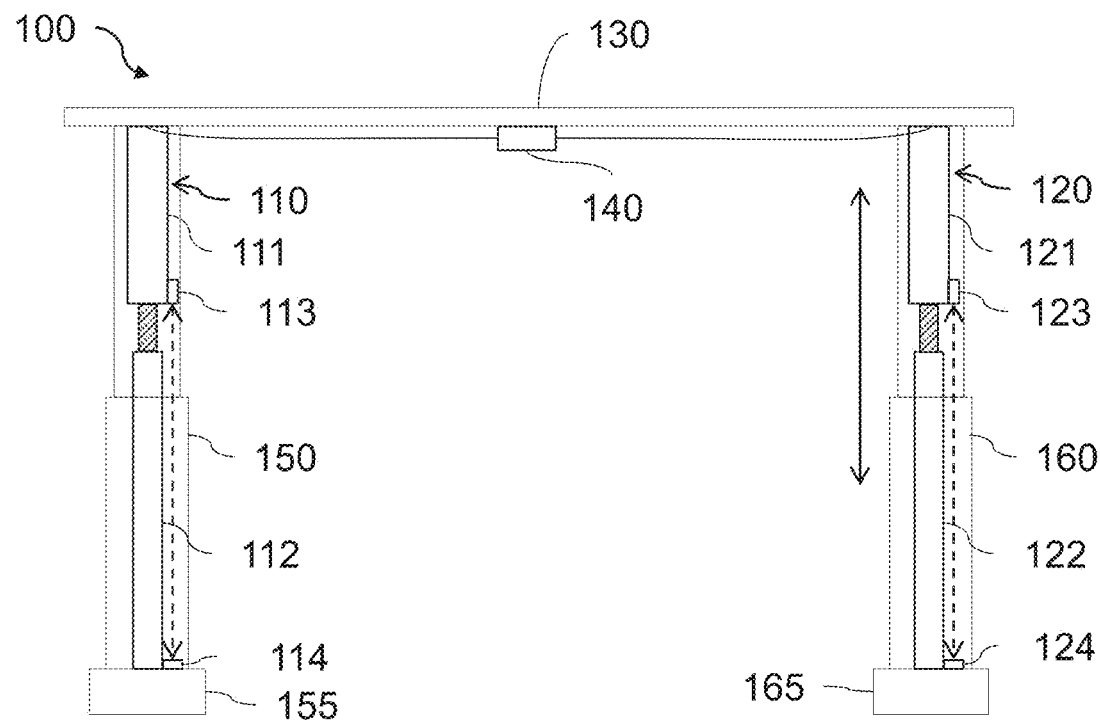
FIG. 1 shows an example implementation of an electrically adjustable piece of furniture formed as a table.

FIG. 1 shows an example of an electrically adjustable piece of furniture in the form of a table 100. The table 100, for example, is designed as a height-adjustable table, e.g. an office table, whereby the height of a table top 130 can be adjusted by means of corresponding actuators 110, 120, which are arranged in telescopic profile tubes 150, 160. The actuators 110, 120 are controlled, for example, by a controller 140. The telescopic profile tubes 150, 160 together with the respective table feet 155, 165 form, for example, a table frame of the table 100. Control elements for triggering an adjustment are not shown for reasons of clarity.

The actuator 110 is formed by a first element 111 and a second element 112, which are adjustable relative to each other. For example, the first element 111 contains an electric drive not shown here, which can effect an adjustment via a spindle shown hatched. A sensor 113 is attached to the first element 111. For example, sensor 113 is arranged to emit a wave parallel to the longitudinal axis of actuator 110 and to receive a wave reflected by a reflecting element or reflector 114. A distance between the first and second element is determined on the basis of a time-of-flight measurement of the wave, e.g. the time of flight between a transmitted pulse and the reception of a reflected pulse.

The sensor 113 preferably contains both an emitter for emitting the wave and a detector capable of receiving and detecting the reflected wave.

The second actuator 120 is the same or identical to the first actuator 110 and also has a first element 121 and a second element 122, corresponding to the elements 111, 112. Furthermore, the second actuator 120 also has a sensor 123 and a reflecting element or reflector 124, by means of which a time-of-flight measurement can be carried out according to the principle described above.

Although only two actuators 110, 120 are shown in FIG. 1, more than two such actuators can also be present at the piece of furniture, for example if the size of the piece of furniture requires this. The at least two actuators 110 and 120 are preferably linear actuators.

The wave, shown as a dotted arrow between the sensors 113, 123 and the reflectors 114, 124, is for example an acoustic wave, especially an ultrasonic wave, or an electromagnetic wave, especially a light wave. The wave is preferably emitted as a pulse and received accordingly.

For example, sensor 113, 123 and reflective element 114, 124 are located near the end of the profile tube 150, 160. However, they can also each be at a fixed distance from the end, for example if a required line of sight would otherwise not be available. The distances from the end are then added to the measured distance to determine an absolute position of the actuator.

A time-of-flight measurement is also known as time-of-flight. The purpose of using appropriate TOF sensors is both wear-free, contactless position detection and, e.g., continuous, absolute position detection at any time.

A TOF sensor is a sensor that, for example, uses laser light and can determine distances over the propagation time and the known speed of light. For use in a furniture system, especially within a lifting column formed by a profile tube and an actuator, a sensor that can determine the distance of a single opposite point is sufficient. Installation inside the lifting column minimizes the influence of ambient light. In addition, the accuracy of the measurement is positively influenced.

The emitted laser light, which typically is invisible to humans, is emitted by an emitter either continuously or pulsed. The light or light packet is completely or partially reflected by a reflecting element (typically white or grey) and received by a detector. The reflecting element can be formed e.g. by the metal of the column, or by attaching a reflecting element or a reflecting layer.

The time between emitting the light and receiving the at least partially reflected light gives the distance the light has travelled, taking into account the speed of light. The current length of the lifting column can be determined from the knowledge of the distance and the arrangement of the sensor and reflective layer in relation to the lifting column. The current height/position of the table 100 can be determined from the length of the lifting column by knowing the position of the lifting column in relation to, for example, the table frame.

Figure 2A:
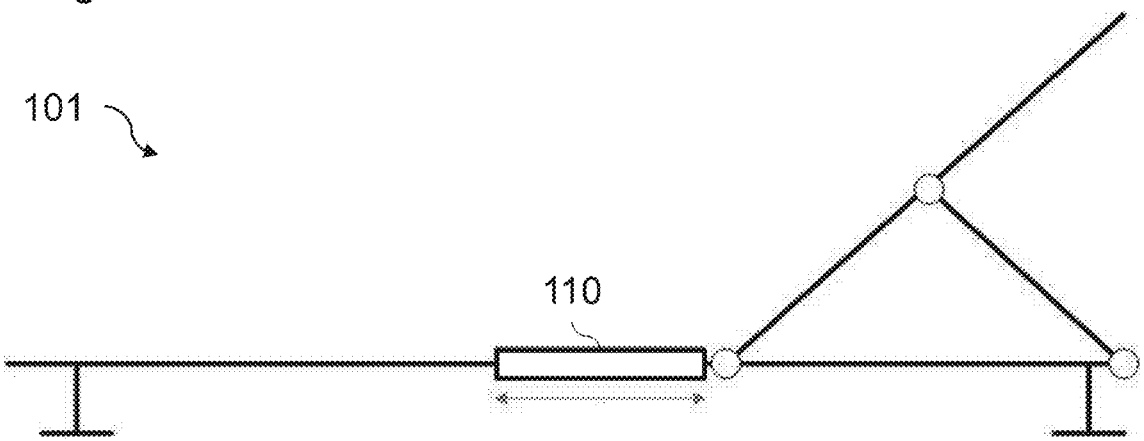
FIGS. 2A and 2B show an example of an electrically adjustable piece of furniture in the form of a bed in two states.
Figure 2B:
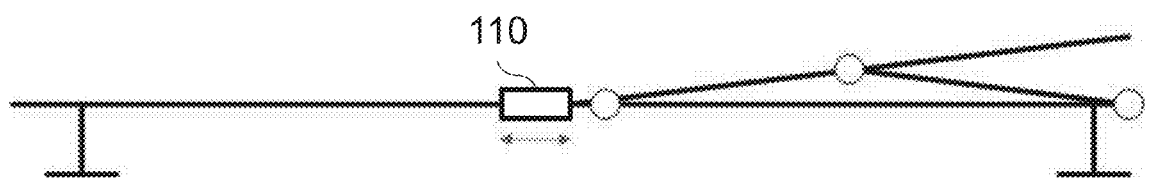

FIG. 2A and FIG. 2B show an electrically adjustable bed in two different positions. The schematic illustration shows an example of an arrangement with which an angle of inclination of a headboard of the bed can be adjusted. The actuator 110 pulls or pushes on an arrangement consisting of the headboard and an arm. Arm and headboard are rotatably connected to each other and on one side rotatably connected to the actuator 110 and on the other side rotatably but not displaceably connected to the bed frame. When the length of the actuator 110 increases, the actuator presses on the assembly of headboard and arm and pushes the headboard upwards.

If the current length of the actuator 110 and the dimensions of the headboard/arm assembly are known, the angle of inclination can be calculated using trigonometric functions. In the side view of bed 101 chosen here, only one actuator 110 is visible. However, such a bed preferably has a second actuator 120, which is mounted in or on another side of the bed frame and causes the adjustment of the headboard synchronously with the shown actuator 110.

The two actuators 110, 120 on the bed 101 are also equipped with sensors for time-of-flight measurement in order to determine the respective position of the actuator. The actuators of the bed can be surrounded by a profile tube as in the table version. The sensors can then be located inside the profile tube. Alternatively, the use of a profile tube can be dispensed with in the case of a bed. In such a configuration, the sensors are preferably arranged inside the actuator in order to minimize the influence of ambient light.

Figure 3:
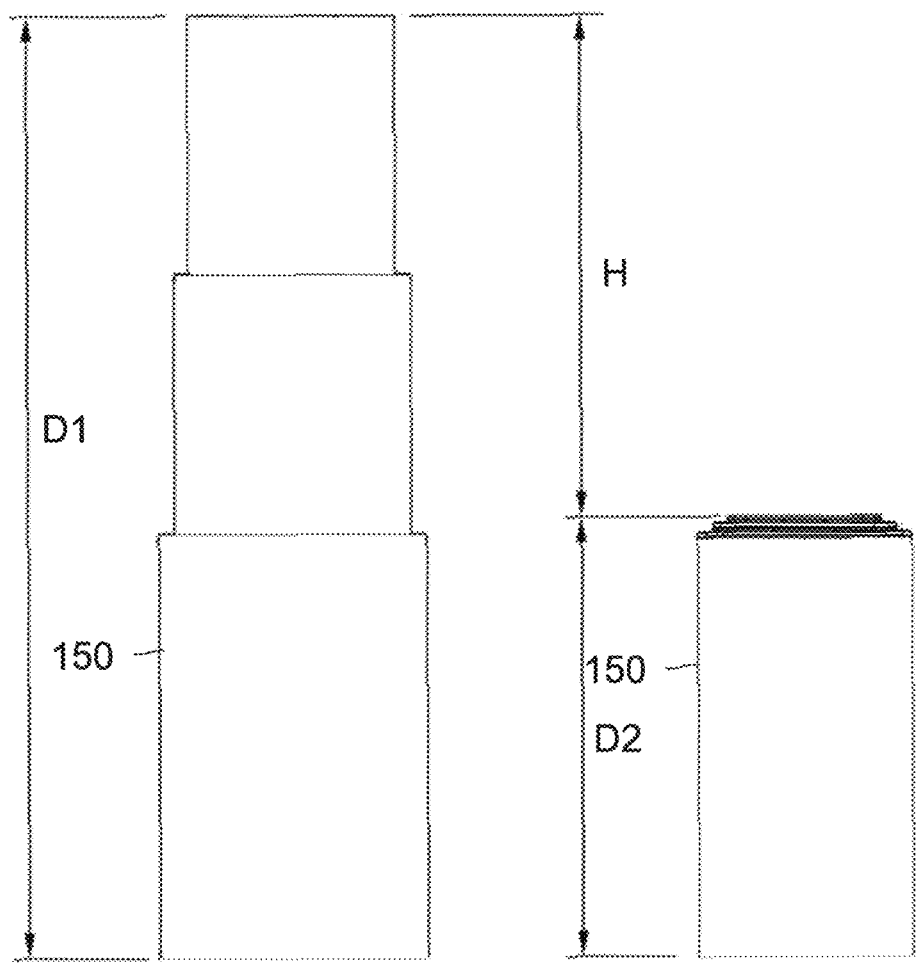
FIG. 3 shows an example of a telescopic profile tube in a side view.

FIG. 3 shows a schematic representation of a telescopic profile tube 150, whereby on the left side the profile tube 150 in extended position is shown with length D1, while on the right side the profile tube 150 in fully retracted position is shown with length D2. This results in a stroke H between the two positions, especially extreme positions.

The profile tube 150 together with the actuator 110, which is not visible in FIG. 3, forms a lifting column whose current position can be determined via the sensors of the actuator 110.

Figure 4:
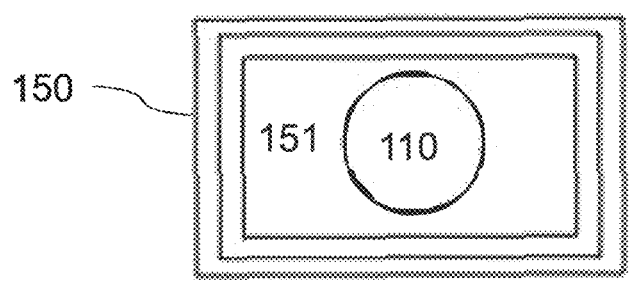
FIG. 4 shows an example of a telescopic profile tube in a side view.

FIG. 4 shows an axial plan view of the lifting column with the profile tube 150 and the actuator 110 arranged inside the profile tube. The profile tube 150 is formed by three telescopically nested rectangular profile parts. A hollow space 151 is located between the actuator 110 shown round and the inner wall of the innermost profile part, in which a sight axis can be provided for the sensors of the TOF sensor.

FIGS. 5 to 9 describe various options for positioning the sensor 113 and a reflective element or reflector 114 on an actuator 110 in a telescopic profile tube 150. For example, the first element 111 of the actuator 110 contains a drive that can be connected to the controller 140. By adjusting the actuator 110, the upper half of the telescopic profile tube 150 can be moved up and down. The sensor 113 also has a connection to the controller 140.

Figure 5:
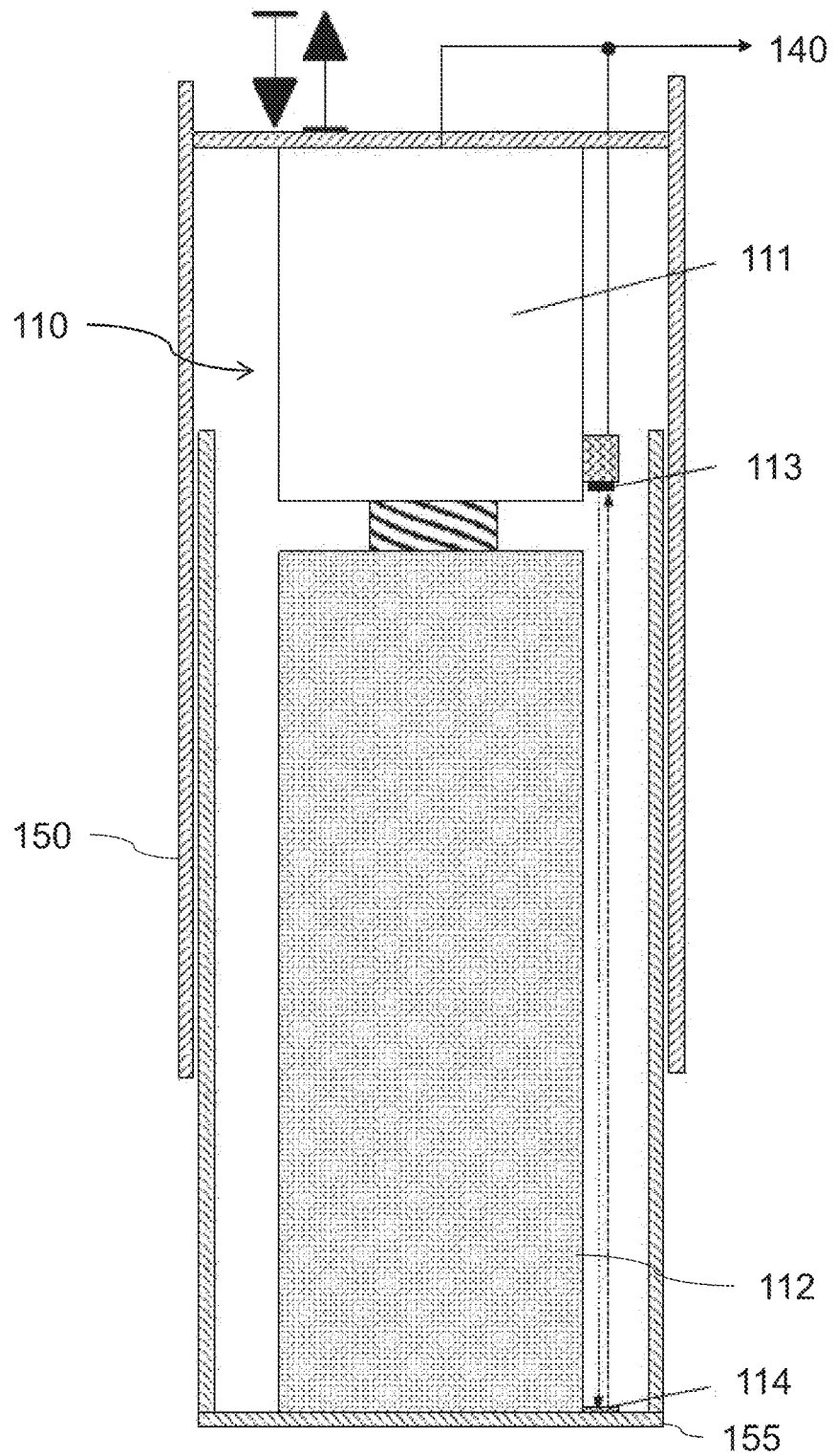
FIG. 5 shows an example implementation of a profile tube with an actuator.

Referring to FIG. 5, the sensor is attached to the first element 111 with an appropriate fixture, while the reflective element 114 is located on the foot section 155. For the determination of the absolute position of the actuator 110, the positions of the sensor 113 and the reflecting element 114 are known.

Figure 6:
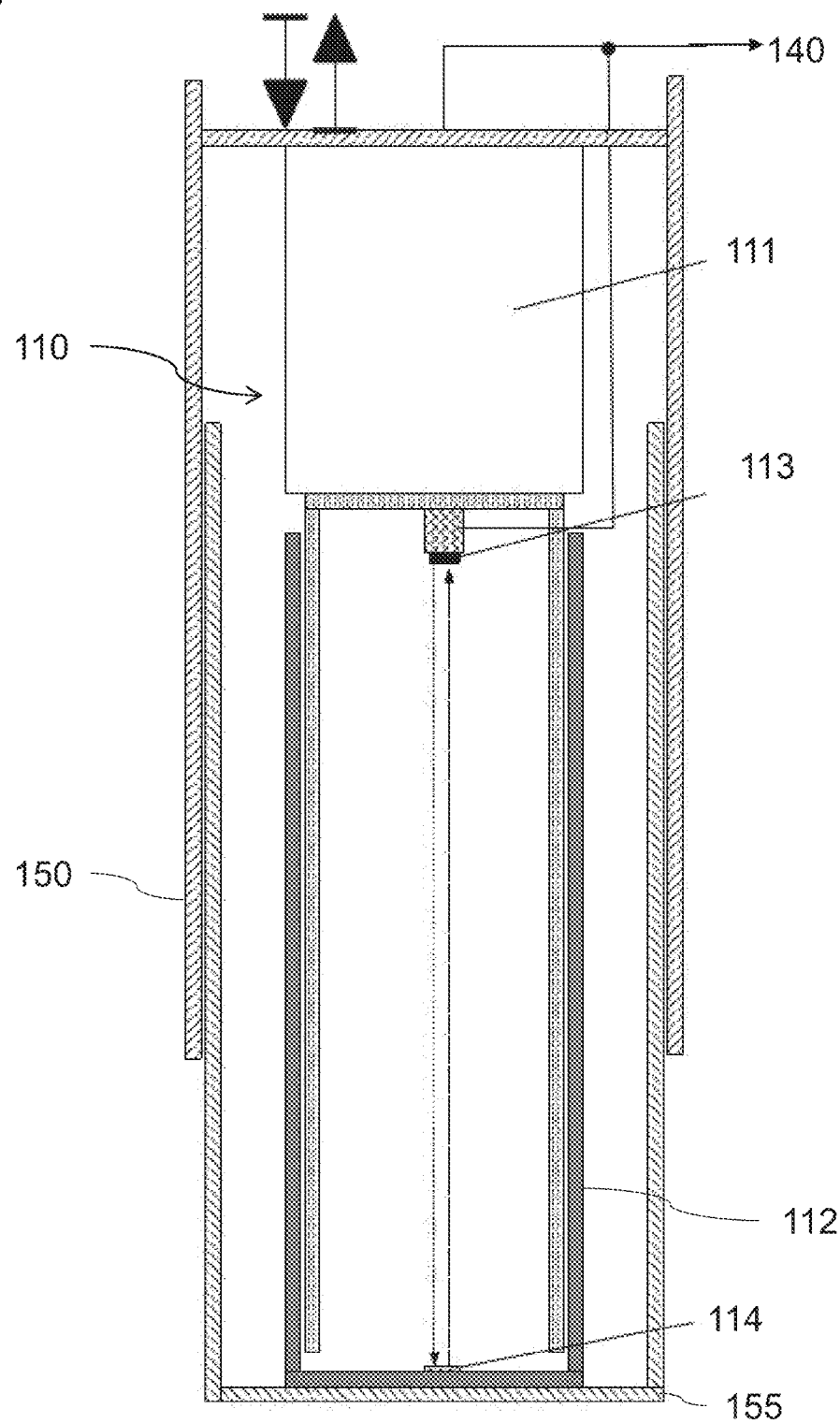
FIG. 6 shows another example implementation of a profile tube with an actuator.

FIG. 6 shows an implementation in which sensor 113 and reflective element 114 are mounted inside the actuator. For example, the elements 113, 114 are located inside or in the area of a rotating hollow spindle driven by the drive. In such an arrangement, the sensors are protected from environmental influences, such as ambient light, even without the use of a profile tube.

To improve the accuracy of the measurement, for example, the light path can be shortened by placing the reflective surface 114 closer to the sensor rather than at the other end of the actuator. This is illustrated, for example, in FIG. 7, FIG. 8 and FIG. 9.

Figure 7:
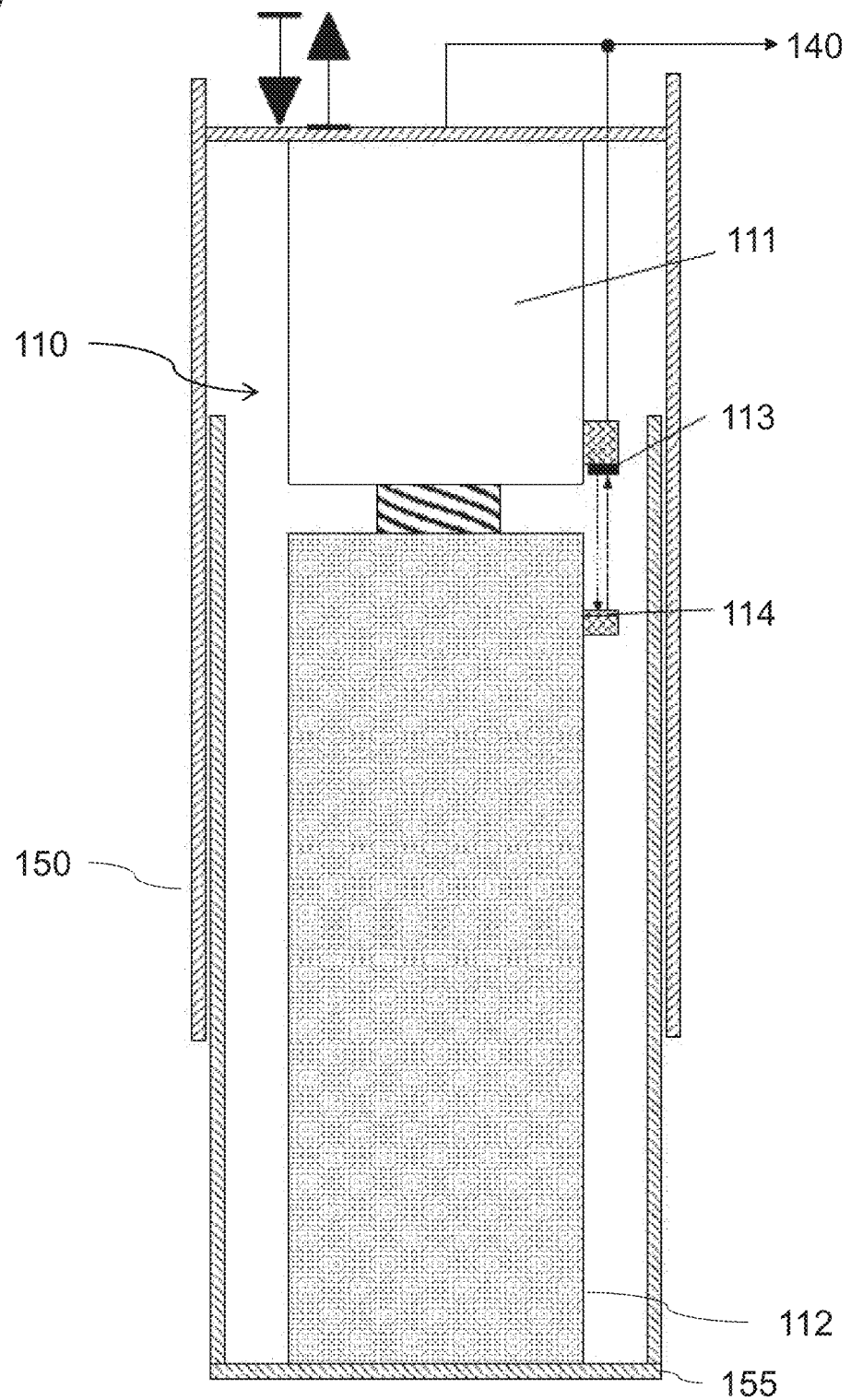
FIG. 7 shows another example implementation of a profile tube with an actuator.

Referring to FIG. 7, a support is attached to the second element 112 of actuator 110, based on the arrangement of FIG. 5, which carries or forms the reflecting element 114. The distance between sensor 113 and reflector 114 is thus shortened.

Figure 8:
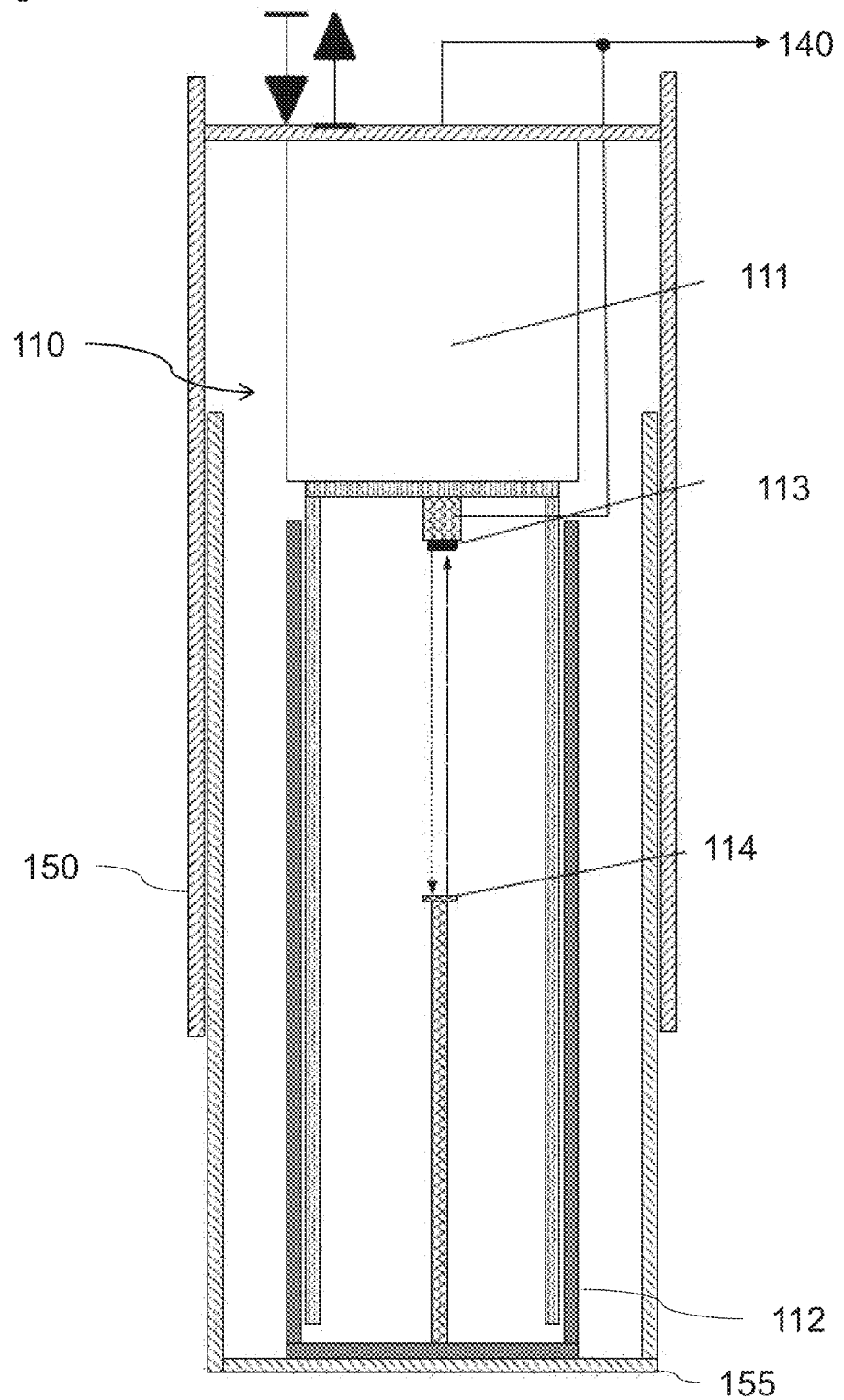
FIG. 8 shows another example implementation of a profile tube with an actuator.

Referring to FIG. 8, which is based on the implementation of FIG. 6, the distance between sensor 113 and reflector 114 is shortened by the fact that inside the relatively rotating elements there is an elevation which brings the reflector 114 closer to the sensor 113.

Figure 9:
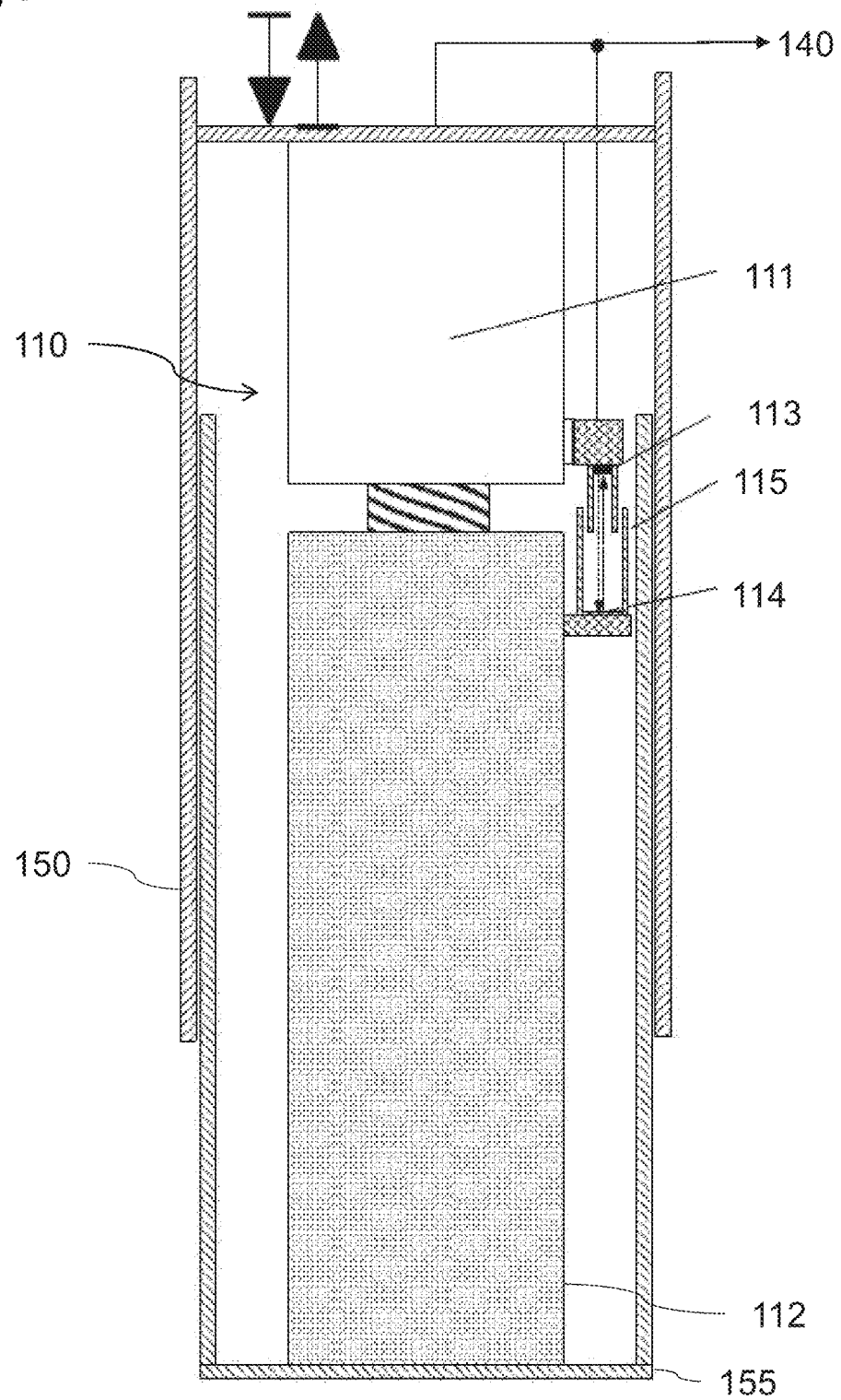
FIG. 9 shows another example implementation of a profile tube with an actuator.

Referring to FIG. 9, a further development of the arrangement of FIG. 7 is shown there. For example, the distance between the sensor 113 and the reflector 114 is provided with a telescopic sleeve 115. An essential feature of the sheathing is that it additionally reduces external influences on the distance between sensor 113 and reflector 114. It is advantageous if the sleeve 115 is flexible in its length, as shown, for example, by the telescopic design. However, this does not exclude other possibilities.

In the implementations of FIG. 7, FIG. 8 and FIG. 9, a distance between the sensor 113 and the reflector 114 in a retracted state of the actuator is preferably selected such that it is smaller than 50% of a length of the actuator in the retracted state, e.g. smaller than 20%.

A further possibility to improve the measurement accuracy is to use a non-volatile memory in the actuator, e.g. EEPROM, Flash or similar, and to perform a calibration procedure, especially during the manufacture of the actuator. This calibration procedure determines the measured values supplied by the sensor for one or more real positions of the actuator. For example, the measured value for each real position is stored in a table in the memory. For example, two real positions, the upper and lower end position of the stroke, can be used. With reference to FIG. 3, this is given for example by the lengths D1 and D2.

During the calibration process, the first end position is approached once and one or more measured values of the sensor are determined. If several measured values are recorded for a position, the measured values for the first end position can be averaged. The measured value or the average value is stored in the table for the first end position. Then the second end position is approached and a measured value or average value for the second end position is determined and stored according to the same scheme. The calibration process is now concluded, for example. Instead of two positions, several positions can be measured and stored.

During operation, the sensor delivers a measured value for a specific position. Based on the knowledge of the calibrated measured values and the real positions, the real position can now be interpolated for this measured value, e.g. linearly interpolated. By using such a table in combination with a one-time calibration process during manufacturing, high accuracy can be achieved.

The calibration procedure for manufacturing thus includes, for example, the following steps:

Moving the system to a defined position with length L1.

Reading the measured value L1_TOF from the TOF sensor.

Storing the length L1 and the TOF-measured value L1_TOF in a non-volatile memory integrated in the actuator.

Moving the system to a defined position with length L2.

Reading the measured value L2_TOF from the TOF sensor.

Storing the length L2 and the TOF-measured value L2_TOF in the non-volatile memory.

With the calibration values of L1, L1_TOF, L2, L2_TOF stored in the actuator, the system can then calculate a length value for each measured value L_TOF, especially based on linear interpolation.

L1 and L2 can, for example, be measured very accurately during manufacturing, e.g. by moving the actuator to a mechanical stop.

The measurement of the respective momentary position of the two actuators by means of a time-of-flight measurement enables a continuous determination of the momentary position, which can be carried out at any time, without having to rely on relative measurements of a movement away from a reference point. This allows a position-synchronous control to be carried out during an adjustment process for a piece of furniture with two or more such actuators.

Figure 10:
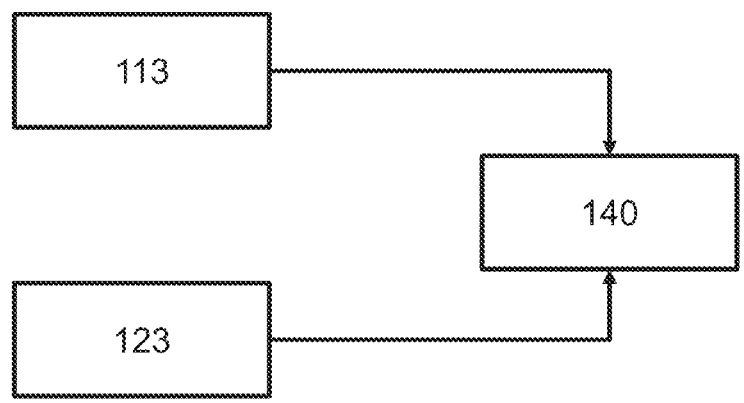
FIG. 10 shows a symbolic block diagram of a controller with connected sensors.

FIG. 10 shows a schematic block diagram in which the controller 140 is supplied with the corresponding distances measured by the sensors 113, 123 as the basis for a control process.

Figure 11:
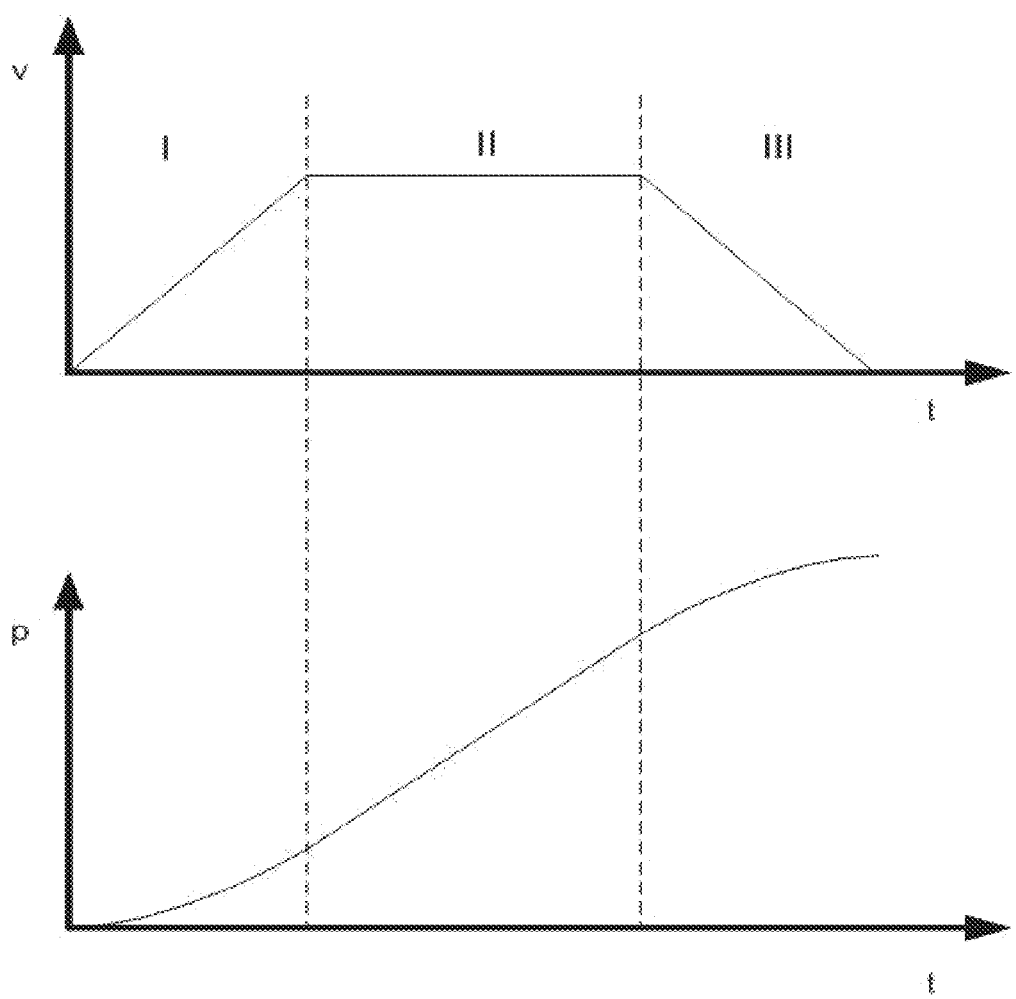
FIG. 11 shows diagrams with a target speed curve and a target position curve.

If an adjustment process is to be carried out while the piece of furniture is in operation, a joint target speed curve for the adjustment operation can be determined in a first step based on a target position and a current position of the first and at least one second actuator. An example of such a speed reference curve is shown in the upper diagram in FIG. 11. A desired speed curve is divided into three phases. In an acceleration phase, represented as phase I, the speed in this example is continuously increased from standstill to a target speed. In a constant phase, represented by phase II, the speed is kept constant. In a braking phase, represented by phase III, the speed is continuously reduced again until the actuator comes to a standstill.

The duration of the acceleration phase and the braking phase, for example, can be adjusted. The duration of the constant phase results, for example, from a determinable duration of the adjustment.

Instead of a linear curve, non-linear curves could also be used in the acceleration phase and the braking phase without leaving the basic idea of the target speed curve. It may also be necessary or expedient to dispense with the constant phase, for example if the range of adjustment or a resulting adjustment time is so short that a certain target speed cannot be reached at all.

In the adjustment operation, based on the target speed curve, a joint target position curve is determined for a large number of points in time during the adjustment operation. An example of such a target position curve is shown in the diagram at the bottom of FIG. 11. It should be noted that velocity v and position p are each displayed in the positive range, but the actual position or velocity curve is of course selected direction-dependently with the corresponding sign.

After determining the desired curves, the respective speeds of the first and at least one second actuator 110, 120 are initially set, for example with a predetermined starting speed, on which the target speed curve can also be based. During an adjustment operation, the controller iteratively, e.g. periodically, compares the momentary absolute positions of each actuator with an associated position value of the nominal position curve. The speed is adjusted individually for each of the actuators as a function of the comparison.

For example, in the case of an actuator that is trailing the target curve, the speed of this actuator is reduced or increased for a lagging actuator. This ensures that in the next comparison the position of the actuator is closer to the required target position. It should be noted that with this type of control, the speed of the respective actuators is increased, decreased or equalized, depending on the position comparison. There is no attempt to set the speed to a specific target speed. It has been shown that the actual speed of the actuator also depends on its load situation, so that two actuators of the same construction, which are controlled with the same signals with regard to current and/or voltage, have different speed characteristics at different loads.

If, for example, the speed of the actuator is set via a PWM controller, the duty cycle of the PWM signal can be increased for acceleration and reduced for deceleration.

A time interval between two consecutive comparisons of one of the actuators is preferably less than 200 ms, e.g. less than 100 ms. Such time intervals allow almost continuous and precise position adjustment with small control deviations.

The implementations described in connection with a table and a bed can also be applied to other pieces of furniture in which actuators are used, such as recliners or other seating and lying furniture.

What is claimed is:

1. An electrically adjustable piece of furniture, comprising
a first and at least one second actuator for adjusting a component of said piece of furniture; and
a controller for controlling the first and the at least one second actuator;
wherein
the first and the at least one second actuator each comprise a first element and a second element, which are displaceable relative to each other, and a time-of-flight sensor mounted on the first element and adapted to measure a distance between the first and the second element based on a time-of-flight measurement of a wave; and
the controller is configured to determine an absolute position of each of the first and the at least one second actuator from the respective measured distance; and
the controller is configured to perform the following for an adjustment operation:
determining a joint target speed curve for the adjustment operation based on a target position and a current position of the first and the at least one second actuator;
determining a joint target position curve for a plurality of points in time of the adjustment operation based on the target speed curve;
initial setting of a respective speed of the first and the at least one second actuator;
iteratively comparing a respective momentary position of the first and the at least one second actuators with an associated position value of the target position curve; and
adjusting the respective speeds of the first and the at least one second actuator based on the respective comparison.

2. The piece of furniture according to claim 1, wherein a time interval between two successive comparison operations of one of the actuators is less than 200 ms.

3. The piece of furniture according to claim 1, wherein the controller is configured to, when adjusting the respective speed, increase the speed of the actuator concerned when the momentary position of the actuator concerned is lagging behind the associated position value of the target position curve, and to decrease the speed of the actuator concerned when the momentary position of the actuator concerned is trailing the associated position value of the target position curve.

4. A method for calibrating an actuator in a piece of furniture, the actuator comprising a first and at least one second actuator for adjusting a component of said piece of furniture, a controller for controlling the first and the at least one second actuator, and a non-volatile memory, wherein the first and the at least one second actuator each comprise a first element and a second element, which are displaceable relative to each other, and a time-of-flight sensor mounted on the first element and adapted to measure a distance between the first and the second element based on a time-of-flight measurement of a wave, and wherein the controller is configured to determine an absolute position of each of the first and the at least one second actuator from the respective measured distance and to determine the respective absolute positions of the first and the at least one second actuator via an interpolation between at least two calibrated individual values on the basis of the respective measured distance, the method comprising:
controlling the actuator to a first defined position corresponding to a first position value;
measuring a first distance between the first and the second element in the first defined position;
storing the first position value together with the associated first distance in the memory;
controlling the actuator to a second defined position corresponding to a second position value;
measuring a second distance between the first and the second element in the second defined position; and
storing the second position value together with the associated second distance in the memory.

5. The method according to claim 4, further comprising:
controlling the actuator to at least one further defined position corresponding to a further position value;
measuring a further distance between the first and the second element in the further defined position; and
storing the further position value together with the corresponding further distance in the memory.

6. The method according to claim 4, wherein the first and the second defined positions are formed by extreme positions of the actuator resulting from a fully retracted state and a fully extended state of the actuator.

7. A method for adjusting a component of a piece of furniture, wherein said piece of furniture comprises a first and at least one second actuator for adjusting the component of said piece of furniture, and a controller for controlling the first and the at least one second actuator, wherein the first and the at least one second actuator each comprise a first element and a second element, which are displaceable relative to each other, and a time-of-flight sensor mounted on the first element and adapted to measure a distance between the first and the second element based on a time-of-flight measurement of a wave, and wherein the controller is configured to determine an absolute position of each of the first and the at least one second actuator from the respective measured distance, the method comprising:
determining a joint target speed curve for the adjustment operation based on a target position and a current position of the first and the at least one second actuator;
determining a joint target position curve for a plurality of points in time of the adjustment operation based on the target speed curve;
initial setting of a respective speed of the first and the at least one second actuator;
iteratively comparing a respective momentary position of the first and the at least one second actuators with an associated position value of the target position curve in order to generate a comparison result; and
adjusting the respective speeds of the first and the at least one second actuator based on the respective comparison result.

8. The method according to claim 7, wherein a time interval between two successive comparison operations of one of the actuators is less than 200 ms.

9. The method according to claim 7, wherein, when adjusting the respective speed, the speed of the first or the at least one second actuator is increased when the momentary position of the first or the at least one second actuator is lagging behind the associated position value of the target position curve, and the speed of the first or the at least one second actuator is decreased when the momentary position of the first or the at least one second actuator is trailing the associated position value of the target position curve.

* * * * *